(12) United States Patent
Altmayer et al.

(10) Patent No.: US 11,808,301 B2
(45) Date of Patent: Nov. 7, 2023

(54) LARGE ROLLER BEARING

(71) Applicant: Liebherr-Components Biberach GmbH, Biberach an der Riss (DE)

(72) Inventors: Thomas Altmayer, Gutenzell-Hürbel (DE); Oliver Born, Altenstadt (DE); Andreas Palmer, Riedlingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 17/070,434

(22) Filed: Oct. 14, 2020

(65) Prior Publication Data
US 2021/0102575 A1 Apr. 8, 2021

Related U.S. Application Data

(63) Continuation of application No. PCT/EP2019/058887, filed on Apr. 9, 2019.

(30) Foreign Application Priority Data

Apr. 17, 2018 (DE) ...................... 20 2018 102 121.4

(51) Int. Cl.
*F16C 33/66* (2006.01)
*F16C 33/58* (2006.01)
(Continued)

(52) U.S. Cl.
CPC ........ *F16C 33/6696* (2013.01); *F16C 19/381* (2013.01); *F16C 33/58* (2013.01);
(Continued)

(58) Field of Classification Search
CPC ........ F16C 19/08; F16C 33/40; F16C 33/405; F16C 33/58; F16C 33/585; F16C 33/6611;
(Continued)

(56) References Cited

U.S. PATENT DOCUMENTS 1,135,177 A * 4/1915 Graham ................. F16C 19/08
384/532
4,909,098 A * 3/1990 Kiryu ..................... F16C 33/41
74/640
(Continued)

FOREIGN PATENT DOCUMENTS

CN 103492539 1/2014
CN 105916722 8/2016
(Continued)

OTHER PUBLICATIONS

Bearings with solid grease, May 2015 (NTN).
SKF bearings with Solid Oil, Dec. 2016 (skf), skf.com | skfusa.com/SolidOil.

*Primary Examiner* — Alan B Waits
(74) *Attorney, Agent, or Firm* — Levine Bagade Han LLP

(57) ABSTRACT

The invention relates to a large rolling bearing, more particularly an open-center large rolling bearing, comprising two concentric running rings, between which a plurality of rolling elements is provided in a bearing gap, which rolling elements roll on at least two raceways. More particularly, the bearing gap between the running rings and/or between at least one running ring and the rolling elements is at least partially filled with a solid lubricant, which comprises a polymer matrix and a lubricant embedded therein.

16 Claims, 4 Drawing Sheets

(51) Int. Cl.
*F16C 19/38* (2006.01)
*F16C 19/49* (2006.01)

(52) U.S. Cl.
CPC ...... *F16C 33/6611* (2013.01); *F16C 33/6614* (2013.01); *F16C 33/6648* (2013.01); *F16C 19/49* (2013.01); *F16C 2300/14* (2013.01)

(58) Field of Classification Search
CPC ............. F16C 33/6614; F16C 33/6648; F16C 33/6696; F16C 2300/14; F16C 19/381; F16C 19/49
See application file for complete search history.

(56) References Cited

U.S. PATENT DOCUMENTS

| | | | | |
|---|---|---|---|---|
| 9,011,014 | B2* | 4/2015 | Suzuki | F03D 80/70 |
| | | | | 384/477 |
| 11,022,176 | B2* | 6/2021 | Delaby | F16C 33/586 |
| 2007/0154128 | A1* | 7/2007 | Mikami | F16C 33/6611 |
| | | | | 384/627 |
| 2012/0134616 | A1* | 5/2012 | Liang | F16C 19/163 |
| | | | | 384/548 |
| 2012/0201487 | A1* | 8/2012 | Kverel | C10M 103/00 |
| | | | | 977/773 |
| 2014/0197006 | A1 | 7/2014 | Kverel | |
| 2016/0245333 | A1* | 8/2016 | Fiesel | F16C 19/18 |
| 2017/0370406 | A1 | 12/2017 | Tran | |
| 2018/0003232 | A1* | 1/2018 | Michael | F16C 33/6611 |

FOREIGN PATENT DOCUMENTS

| | | | |
|---|---|---|---|
| CN | 206668764 U | 11/2017 | |
| DE | 69902410 T2 | 4/2003 | |
| DE | 60025110 T2 | 9/2006 | |
| DE | 60213139 T2 | 11/2006 | |
| DE | 202007002609 | 5/2008 | |
| DE | 102007041549 | 3/2009 | |
| DE | 102008049813 | 4/2010 | |
| DE | 102010051968 | 5/2012 | |
| DE | 102014104599 | 10/2015 | |
| EP | 2092204 | 8/2009 | |
| EP | 2711572 | 3/2014 | |
| EP | 2762737 | 8/2014 | |
| EP | 3078869 A1 * | 10/2016 | ............. F16C 33/40 |
| JP | H07-253113 | 10/1995 | |
| JP | 2003-042165 | 2/2003 | |
| JP | 2003214446 | 7/2003 | |
| JP | 2003222140 | 8/2003 | |
| JP | 2004-231881 | 8/2004 | |
| JP | 2006022851 | 1/2006 | |
| WO | WO 2008/088213 | 7/2008 | |
| WO | WO 2019/201662 | 10/2019 | |

* cited by examiner

LARGE ROLLER BEARING

CROSS-REFERENCE TO RELATED APPLICATIONS

This application is a continuation of International Patent Application Number PCT/EP2019/058887 filed Apr. 9, 2019, which claims priority to German Patent Application Number DE 20 2018 102 121.4 filed Apr. 17, 2018, the contents of which are incorporated herein by reference in their entireties.

BACKGROUND

The present invention relates to a large roller bearing, in particular to an open centered large roller bearing, having two concentric ball races between which a plurality of rolling elements are arranged in a bearing gap, for example one or more axial bearings and/or one or more radial bearings.

With large roller bearings for special applications, considerable bending moments and tilting forces at times act on the bearing rings which can lead to twisting and to an angular offset of the ball races with respect to one another such that premature wear occurs in the region of the ball races and of the rolling elements. Such large roller bearings can have dimensions of one or more meters in diameter and can, for example, be used on wind turbines to support the rotor blades adjustably in their pitch angle at the hub or to support the hub rotatably at the nacelle or also on cranes in order, for example, to rotatably support and to prop up the support mast of a ship crane or of a harbor crane, with here not only vertical forces having to be absorbed, but also bending moments or tilt loads. The twisting and tilting problems are in this respect further aggravated when the middle or center of the bearing has to be kept free to be able to arrange the pitch drives or to allow the component to be supported, for example said crane support mast, to pass through the bearing or to be able to attach a rotary drive to the part which has to be passed through.

A permanent and reliable lubrication is particularly important: with such large roller bearings since otherwise damage can quickly arise at the raceways and at the rolling elements due to the extremely high loads and also to the very special conditions of use. On the one hand, the high forces and bending moments can result in asymmetrical loads and twists that in particular also make a uniform lubrication difficult due to the low rotational speeds. The speeds with large roller bearings are as a rule below 250 r.p.m., with the bearings also frequently being completely stationary over long time periods or continuously returning to the same position in many cases of use such as is the case, for example, with the rotor blade bearings of a wind turbine that frequently have the same pitch angle set. With such slowly rotating and/or often stationary large roller bearings, the lubricant is distributed evenly over the total bearing with difficulty and in particular the highly loaded rolling elements and thus the raceway sections in engagement therewith are heavily loaded.

A large roller bearing of the initially named kind is shown, for example, in the document EP 2 092 204 B 1, in accordance with which the scraper ring of the one ball race is to be clamped by two oppositely disposed axial bearings and two oppositely disposed radial bearings in the groove of the other ball race, wherein said oppositely disposed axial bearings and radial bearings should prevent unwanted deformations of the scraper ring and should avoid a peeling of the ball races in the radial direction. The document WO 2008/088 213 A2 shows a similar large roller bearing and its installation situation at the support mast of a ship crane.

To avoid damage such as pitting, shrinking of the raceways, premature rolling element wear, etc. with such large roller bearings due to insufficient lubrication, such large roller bearings frequently have lubricant feed systems via which grease or oil or a similar lubricant can be continuously topped up or reconveyed. For example, lubricant bores through which lubricant can be conveyed onto the raceways or to the rolling elements are provided in the bearing rings. To avoid a leak due to the reconveying or pressing in of the lubricant and to hold the oil or grease in the bearing, seal systems are typically used that seal the bearing gap between the ball races toward the outside or toward the environment. Such seal systems not only serve the prevention or limitation of lubricant leaking, but are also intended to prevent dirt such as dust or other harmful media from entering into the bearing gap from the outside.

Such seal systems are, however, often not leak tight for various reasons with large roller bearings, for example when deformations of the bearing rings occur due to the very high forces and bending moments. In addition, with large roller bearings work is sometimes carried out at higher lubricant pressures due to their size so that the lubricant reaches all the bearing regions. Such leaks, on the one hand, allow lubricant to escape and, on the other hand, dirt and other harmful media to penetrate, for example moisture, that then dilutes the lubricant or can lead to a washing out or degradation of the grease, whereby the bearing loses the required lubrication and fails as a result. To prevent the lubricant entering into the environment on a leak, expensive collection measures often have to be taken and the collected lubricant has to be disposed of.

These operating problems are accompanied by a high servicing effort. On the one hand, the bearings have to be constantly relubricated, which can be very laborious depending on the site of use and the arrangement of the bearings so that the relubrication is often not carried out at the prescribed intervals in practice, which can then result in a failure of the bearings. On the other hand, said seal systems that are intended to prevent a leaking of the lubricant and a penetration of dirt are wear parts that likewise have to be replaced regularly, which likewise brings about a high servicing effort and can result in a standstill or longer downtimes of the system.

It is the underlying object of the present invention to provide an improved large roller bearing of the initially named kind which avoids disadvantages of the prior art and further develops the latter in an advantageous manner. An open centered large roller bearing should in particular be provided that is protected against damage or failure due to insufficient lubrication, without acquiring this at the cost of a high servicing effort and sealing problems.

SUMMARY

Said object is achieved in accordance with the invention by a large roller bearing in accordance with claim 1. Preferred embodiments of the invention are the subject of the dependent claims.

It is therefore proposed no longer to lubricate the rolling elements and raceways with conventional oil or grease, but rather to fill the bearing gap between the ball races and/or between at least one of the bearing rings and the rolling elements at least partially with a solid lubricant that comprises a polymer matrix and a lubricant embedded therein.

The bearing becomes at least almost maintenance-free by such a filling of the bearing with a solid lubricant. A washing out and degradation of the lubricant in particular no longer takes place.

Said solid lubricant can in particular be provided and configured to dispense the lubricant contained in the polymer matrix under load and/or on movement and/or to take it up again on load removal and/or standstill. The polymer matrix can per se be hardened or solidified for this purpose, but in so doing can also be formed as compressible and/or deformable and/or variable in volume so that on a compression of the polymer matrix by a pressure applied via the rolling elements and/or the raceways onto the solid lubricant filling, lubricant contained therein is dispensed and is taken up again when the polymer matrix tensions again as the pressure reduces. The polymer matrix can serve in the manner of a sponge as a buffer for the lubricant embedded therein.

A large number of lubrication problems specific to large roller bearings can be solved or at least alleviated with such a solid lubricant by the at least partial, preferably complete, filling of the bearing gap in which the rolling elements run. The deformations of the bearing rings occurring as a result of the high forces in particular no longer result in a tearing of the lubricant film with an open centered large roller bearing. On the contrary, on the occurrence of deformations and the crushing or deformations of the solid lubricant associated therewith, lubricant portions can be actively dispensed from the matrix and the particularly highly loaded rolling elements can be more actively lubricated without a sophisticated lubricant feed via lubricant bores or lubricant feed channels having to be provided and controlled in a complicated manner for this purpose. A sufficient lubrication can here also be maintained at the low speeds typical for large roller bearings.

In an advantageous further development of the invention, at least one of the raceways can in particular have a lubricant pocket in the manner of an elongate groove in a center section that is filled, preferably completely filled, with solid lubricant and is flanked at both sides by raceway sections that support the roller bearings. In the region of said lubricant pocket in the manner of an elongate groove, a small gap or cavity is per se provided between the respective rolling element and the material of the ball race in which a longitudinal cutout is provided in the raceway in its center section. This groove-like longitudinal cutout acting as a lubricant pocket is filled with the solid lubricant so that lubricant is provided from the polymer matrix and is moved into the contact zone between the raceway and the rolling element, in particular at a strong pressure of the rolling element on the raceway. The laterally flanking raceway sections can in particular be lubricated from the lubricant pocket provided in the raceway center.

Such a lubricant pocket that is centrally provided in the raceway and that is filled with solid lubricant can in particular be sensible when the raceway sections provided at both sides, that is at the right and left toward the margins of the raceway, can each nestle in approximately shell form at the rolling elements that in this case can advantageously be formed as spherical or of barrel shape. With such raceway sections contoured in shell form, said longitudinal groove-like lubricant pocket in the center section of the raceway can advantageously form, viewed in cross-section, a convexity that is contoured in approximately crescent shape and that is filled with the solid lubricant. A crushing of the solid lubricant, whereby lubricant is pressed onto the contact surfaces, occurs by such a crescent shaped cross-sectional contouring of the lubricant pocket on light deformations, in particular toward the margins, that is neighboring the adjacent shell-shaped raceway sections.

Said central elongate groove-like lubricant pocket can, however, generally also be differently contoured, for example, formed, viewed in cross-section, as triangular or in a U shape.

Such a lubricant pocket in the raceway can not only be provided with ball bearings or spherical bearings, but also with other rolling element shapes such as cylindrical bearings, conical bearings, or needle bearings.

Both mutually oppositely disposed raceways can advantageously each be provided with such an elongate groove-like lubricant pocket so that the rolling elements are supplied with lubricant from oppositely disposed sides and at every raceway. The mutually oppositely disposed raceways can here each be provided with such an elongate groove-like lubricant pocket in a center section. It would, however, alternatively also be possible to offset the lubricant pockets with respect to one another at the oppositely disposed raceways in the direction of the axis of rotation of the rolling elements, for example such that a lubricant pocket arranged in the center sections is provided at the one raceway, while two mutually spaced apart lubricant pockets are provided at the oppositely disposed raceway. The rolling elements can be effectively supplied with lubricant over their total contact surface—viewed in cross-section—by such offset lubricant pockets at the oppositely disposed raceways.

Depending on the design of the bearing and on the pitch of the raceways, asymmetrically arranged elongate groove-like lubricant pockets can optionally also be provided, for example such that, viewed in cross-section, the lubricant pocket is arranged slightly offset to the left at the one raceway and slightly offset to the right at the oppositely disposed raceway.

In an advantageous further development of the invention—alternatively or additionally to said lubricant pockets in the raceways—the bearing gap between the bearing rings can also be filled with solid lubricant laterally next to the rolling elements and/or their raceways. If the bearing gap and a rolling element are viewed in cross-section, the bearing gap to the right and/or left of the rolling element can therefore in particular be filled with the solid lubricant. The solid lubricant can here advantageously connect the two bearing rings to one another and form a bridge that extends between the two bearing rings and connects or contacts them to one another. In order words, the solid lubricant in said bearing gap can have a thickness that substantially corresponds to the clearance of the bearing gap.

Depending on this, the solid lubricant can here fill said bearing gap to the left and/or right of the rolling element row in each case over a width—in the direction of the axis of rotation of the rolling element—of the bearing gap that at least respectively, i.e. on each side of the rolling element, corresponds to at least a third of the diameter or of the width of the rolling element. The solid lubricant can in particular substantially fill, preferably completely fill, the total bearing gap at both sides of the rolling element row.

Said solid lubricant can here form a completely closed ring at at least one side of the rolling element row, said ring sealing the bearing gap and the rolling elements arranged within the solid lubricant toward the outer side of the bearing. If said bearing gap is completely filled with solid lubricant so that it forms a bridge between the two bearing rings, the solid lubricant itself can effectively prevent the penetration of dirt such as dust or other harmful media into the interior of the bearing. Separate seals that are formed separately from the solid lubricant and that would seal the bearing gap or the bearing interior can optionally be dispensed with so that the solid lubricant forms the only sealing device.

Alternatively or additionally to a filling of the bearing gap sections laterally next to the rolling element row, the bearing gap sections between the rolling elements of a rolling element row can also be filled with solid lubricant, with said bearing gap sections between the rolling elements advantageously being able to be completely filled with solid lubricant.

Such a solid lubricant filling of the cavities between adjacent rolling elements of a rolling element row can, in an advantageous further development of the invention, simultaneously serve as spacers that keep the rolling elements at a distance from one another. The solid lubricant hereby has a dual function. On the one hand, the solid lubricant effects a lubricant supply of the rolling elements. On the other hand, the solid lubricant has the effect that the rolling element row are kept at a distance from one another.

In a further development of the invention, the solid lubricant can here form a cage-like spacer structure in the bearing gap between the bearing rings, which cage-like spacer structure runs around relative to the bearing rings together with the rolling elements and positions the rolling elements of a rolling element row toward one another in the manner of a cage. Such a cage-like spacer structure can in particular comprise spacer pieces between adjacent rolling elements, on the one hand, and connection webs, on the other hand, that connect the spacer sections to one another. Said cage-like spacer structure can here be completely formed by the solid lubricant whose polymer matrix provides sufficient structural strength to be able to keep the rolling elements at a distance.

In an advantageous further development of the invention, separate spacers or separate spacer structures such as a rolling element cage can optionally be fully dispensed with since the solid lubricant filling can form the spacers or the spacer structure.

The matrix material of the solid lubricant can form, in an advantageous further development of the invention, a porous structure that comprises a plurality of small-volume cavities in which the lubricant can be embedded. The matrix material can here be a polymer material that can be hardened to form a viscous structure that can, however, absolutely have a viscously deformable, for example rubber mat-like or sponge rubber-like deformability, to be able to adapt itself on the occurrence of deformations and forces in the bearing gap.

The matrix of the compound can in particular comprise a high molecular or ultrahigh molecular polymer in which a synthetic base oil can be embedded as lubricant, for example. A high molecular or ultrahigh molecular polyethylene can be used as the matrix, for example.

In a further development of the invention, the lubricant portion of the solid lubricant can amount to more than 50 mass % or more than 50 volume percent with respect to its total mass or total volume. The lubricant portion can advantageously also amount to more than 66 mass % or volume percent. The rest of the solid lubricant can be substantially formed by the polymer matrix and also in smaller portions by further additives. For example, the portion of the polymer matrix in the total solid lubricant can amount to 20-40 mass % or volume percent.

The large roller bearing can generally be formed in one row, but can advantageously also comprise a plurality of roller bearing rows. One or more axial bearing rows and/or one or more radial bearing rows can in particular be provided to support the two mutually rotatable, concentrically arranged bearing rings in an axial and/or radial direction. In this respect, one or more or every one of said axial and/or radial bearing rows can be provided in the previously described manner with at least one elongate groove-like lubricant pocket in the raceway and/or with a solid lubricant filling in the bearing gap laterally next to the bearing row and/or with a solid lubricant filling between the rolling elements of a bearing row. The total bearing gap in which optionally a plurality of bearing rows are arranged can in particular also advantageously be completely filled with solid lubricant.

Corresponding to the dimensions of a large roller bearing, the radially outermost and/or the radially innermost rolling element rows can define a diameter of at least 750 mm, with said diameter, however, also being able to amount to more than 1000 mm or more than 2000 mm or more than 3000 mm.

Said raceways at the bearing rings can be formed as marginal layer hardened, in particular inductively hardened, for example to a hardness of at least 56 HRC or at least 58 HRC or also more than 60 HRC.

At least one of the bearing rings can be connected to the connection construction, for example by bolts.

In a further development of the invention, in particular one of the bearing rings can be provided with gear teeth and/or can be rotationally fixedly connected to a gear tooth ring so that one of the bearing rings can be driven by a corresponding drive, for example via an electric motor or hydraulic motor via a drive pinion.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
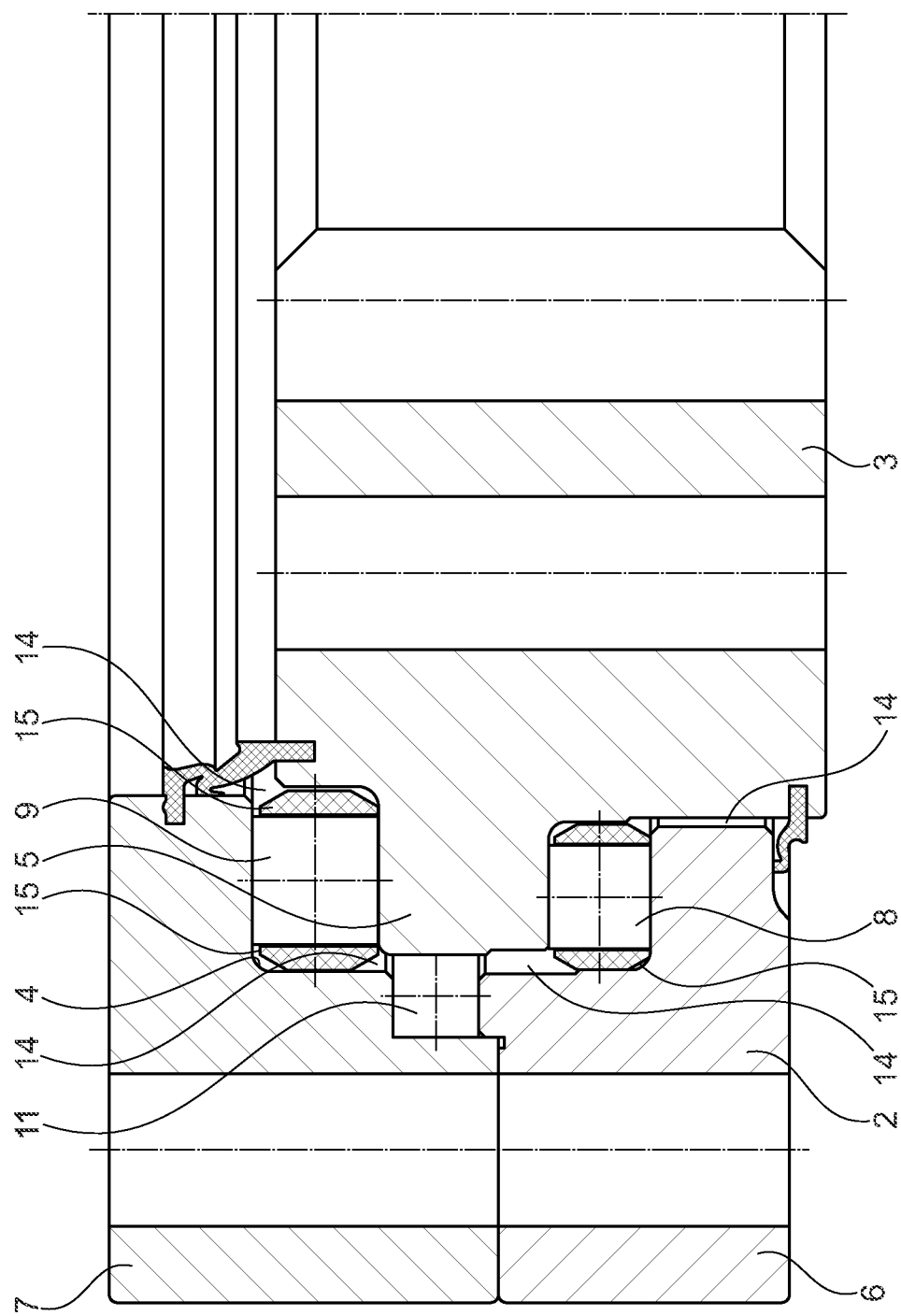
FIG. 1: a longitudinal half-section of an open centered large roller bearing in accordance with an advantageous embodiment of the invention according to which the two ball races are supported with respect to one another by two axial bearings in the form of cylinder roller bearings and by one radial bearing in the form of a cylinder roller bearing.
Figure 2:
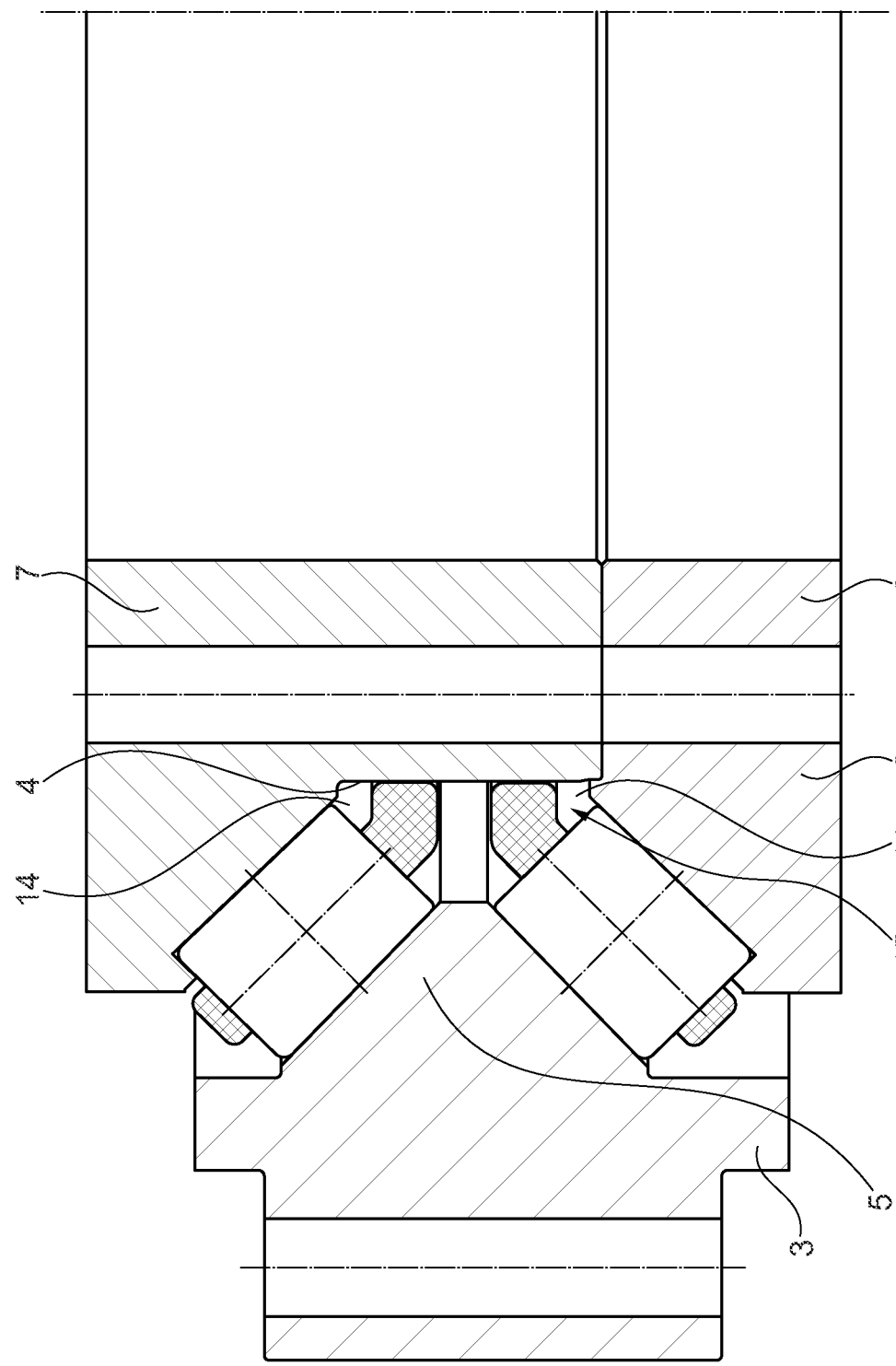
FIG. 2: a longitudinal half-section of an open centered large roller bearing in accordance with a further advantageous embodiment of the invention according to which the two ball races are supported with respect to one another by two conical roller bearings.
Figure 3:
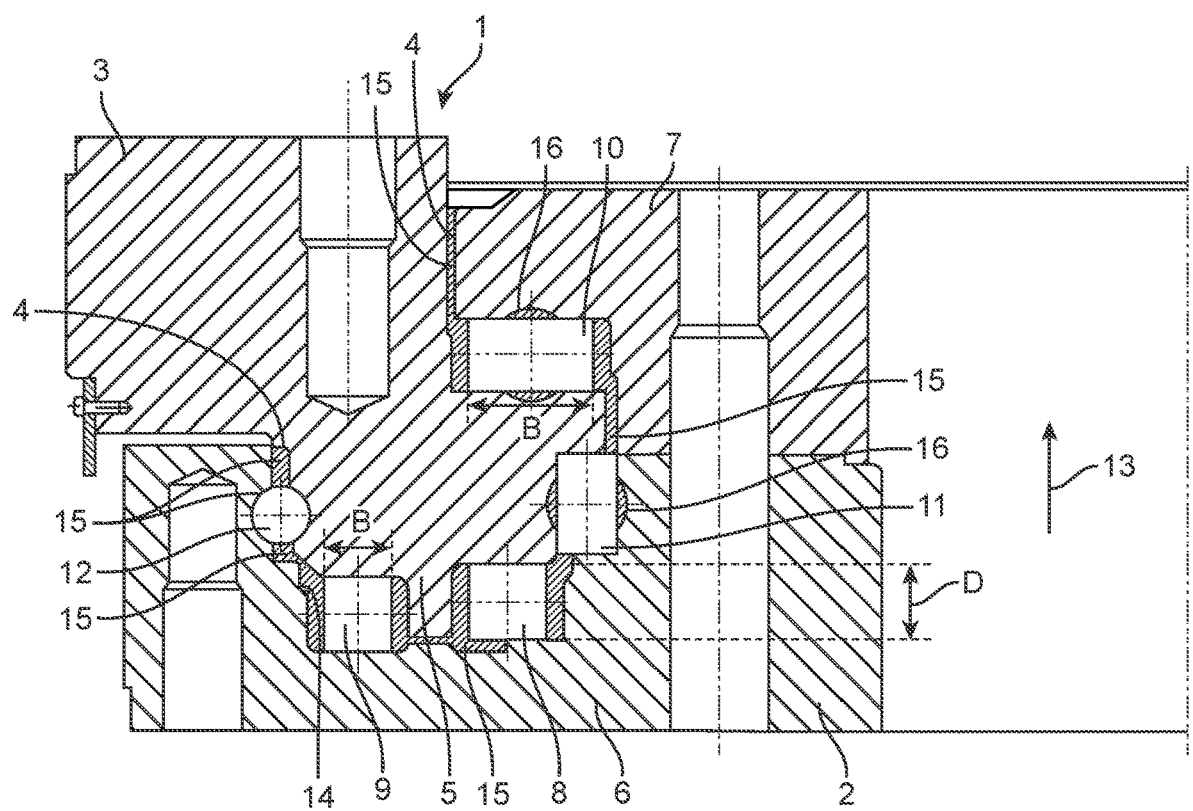
FIG. 3: a longitudinal half-section of an open centered large roller bearing in accordance with a further advantageous embodiment of the invention in accordance with which the two ball races are supported with respect to one another by three axial bearings in the form of cylinder roller bearings and by two radial bearings in the form of a ball bearing and a cylinder roller bearing.

As FIGS. 1 to 3 show, the large roller bearing 1 can comprise two ball races 2 and 3 of which the one ball race 2 forms an inner race and the other ball race 3 forms an outer race. Said inner race 2 can have a smaller inner diameter than the outer race 3 and/or the outer race 3 can have a larger outer diameter than said inner race 2.

As FIG. 1 shows, the one ball race 2, preferably the outer race, can have a groove 4 open toward the other ball race 3, preferably toward the inner race, and the other ball race 3 engages by a scraper ring 5 provided thereat into it while forming a gap or with a spacing at all sides. As FIG. 1 shows, said groove can here engage around the scraper ring 5 from three sides, and admittedly at two oppositely disposed end face sides and one jacket surface side.

As FIG. 1 shows, the one ball race 2 can be supported with respect to the other ball race 3 by three bearings, for example two axial bearings 8 and 9 and one radial bearing 11, with said axial and radial bearings 8, 9, and 11 being able to be arranged in the groove between said scraper ring 5 and said groove 4.

As FIG. 1 shows, the axial bearings 8, 9 and the radial bearing 11 can each be formed as cylinder roller bearings, with the radial bearing 11 being able to have smaller rolling elements than the two axial bearings 8 and 9. The two axial bearings 8 and 9 can in turn have differently dimensioned rolling elements depending on the direction in which greater axial forces act.

As FIG. 2 shows, the two ball races 2 and 3 can be supported with respect to one another, but also by two conical roller bearings that can transmit both axial forces and radial forces. For example, the one ball race 3, for example the outer race, can have a wedge surface ring 5 that projects toward the other ball race 2 and engages into a groove 4 having wedge-shaped flanks formed there. Said conical rolling elements of the conical bearings can be arranged in the gap between the wedge ring 5 and the oblique surface groove 4.

FIG. 3 shows a further possible embodiment. The one ball race 2, for example the inner race, can have a groove 4 open toward the other ball race 3, preferably toward the outer race, and the other ball race 3 can engage by a scraper ring 5 provided thereat into it while forming a gap or with a spacing at all sides. Said groove 4 can in this respect advantageously engage around the scraper ring 4 from four sides, and indeed at two oppositely disposed jacket surface sides and at two oppositely disposed front surface sides of said scraper ring 5.

To be able to set the scraper ring 5 into said groove 4, the ball race 2 having the groove 4 can be composed of a support race 6 and a holding race 7 which can be set thereon, cf. FIG. 1.

Said scraper ring 5 is also supported with respect to the groove 4 by three axial bearings 8, 9 and 10 and by two radial bearings 11 and 12 as FIG. 3 shows. In this respect, two of said axial bearings 8 and 9 can be arranged at the same front side of the scraper ring—at the bottom in accordance with FIG. 3—and the third axial bearing 10 can be arranged at the oppositely disposed front side of the scraper ring. The radial bearings 11 and 12 can also be arranged at oppositely disposed sides, namely at oppositely disposed jacket surface sides of said scraper ring 5 such that the scraper ring 5 is embedded in the manner of a sandwich or is supported both in the axial direction and in the radial direction between bearings located at oppositely disposed sides. The scraper ring 5 is supported at the groove 4 at all sides.

As FIG. 3 shows, the two axial bearings 8 and 9 provided at the same end face of the scraper ring are not only spaced apart from one another in the radial direction and at different raceways, but are also arranged offset from one another in the axial direction—i.e. in the direction of the arrow 13—such that the two axial bearings 8 and 9 are not at the same level.

The two radial bearings 11 and 12 can be arranged disposed opposite one another. Independently of this, it can be advantageous for the two radial bearings 11 and 12 to be arranged between the axial bearings 8, 9 and 10, cf. FIG. 3.

As the Figures show, different rolling element types can be used. The two radial bearings 11 and 12 can in particular have different roller body geometries, with one of the radial bearings 11 in particular being able to be configured as a cylinder roller bearing and the other radial bearing 12 as a ball bearing.

Figure 4:
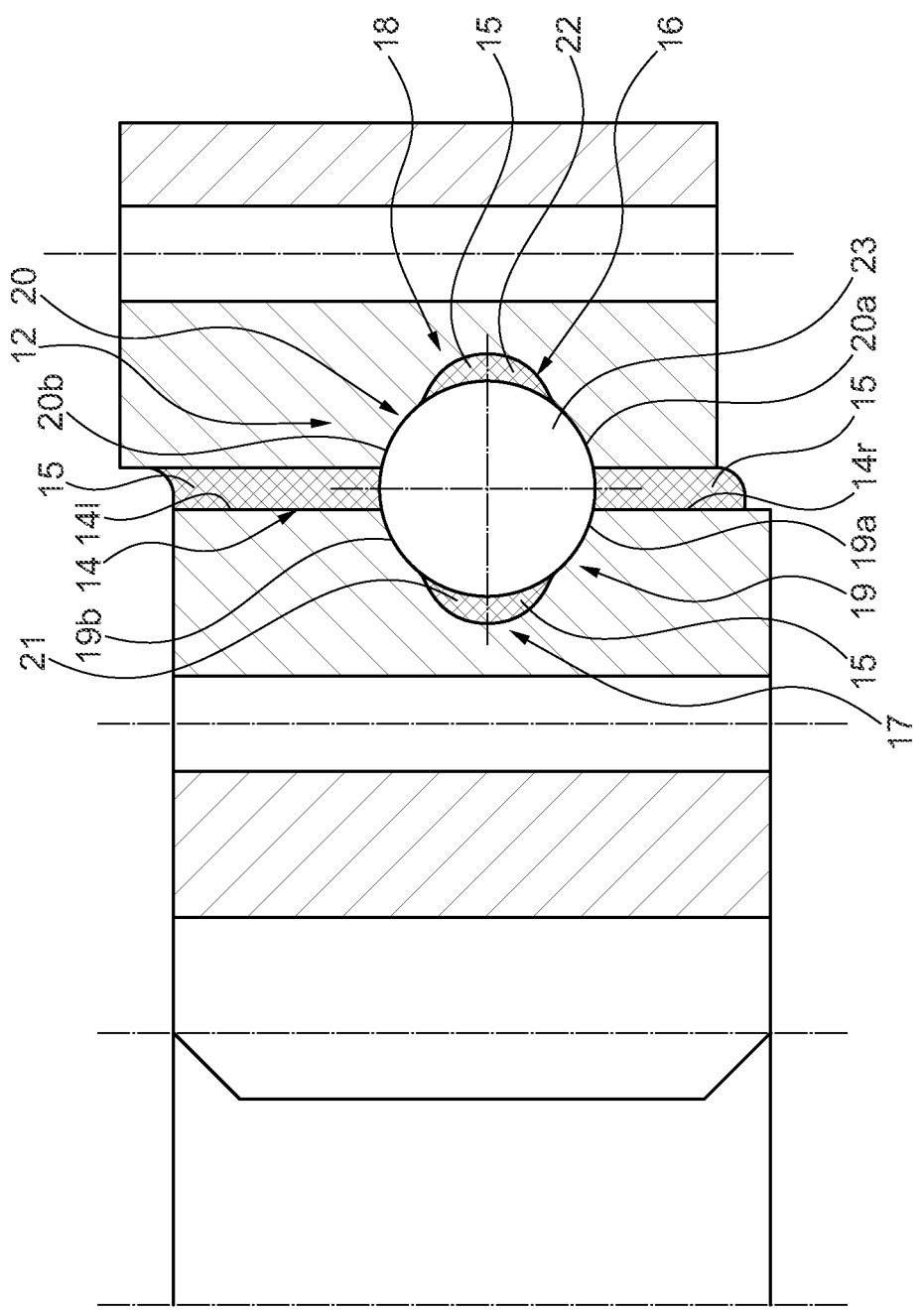
FIG. 4: a partially sectional view of the large roller bearing of FIG. 1 in the region of the ball bearing row that shows the bearing gap filled with solid lubricant.

As FIG. 4 shows, the bearing gap 14 between the ball races 2 and 3 of the large roller bearing 1 can preferably be completely filled with a solid lubricant.

At least one raceway of at least one bearing row, for example the raceways of the axial bearing 12 formed as a ball bearing, but optionally also the other bearing rows, can here advantageously have an elongate groove-like lubricant pocket 16 in a center section of the raceway, with such a lubricant pocket 16 that extends in the manner of an elongate groove along the rolling element row, cf. FIG. 4, advantageously being able to be provided in each of the two oppositely disposed raceways of the respective bearing row. Alternatively, such a lubricant pocket can, however, also be omitted, cf. FIGS. 1 and 2.

As FIG. 4 shows, center sections 17 and 18 of the raceways 19 and 20 can be provided with an elongate groove-like cutout that forms a lubricant pocket 21 or 22 and is preferably completely filled with solid lubricant 15. Raceway sections 19a, b and 20a, b that support the rolling elements 23 adjoin both sides of said lubricant pocket 21 and 22.

As FIG. 4 shows, said lubricant pocket 21 and 22 can have, viewed in cross-section, an approximately crescent-shaped contouring that can have a maximum depth centrally at the center and runs out ever flatter and/or forms scythe tips at the sides.

If said rolling elements 23 are formed as balls, as FIG. 4 shows, the laterally adjoining raceway sections 19a, b and 20a, b can each be contoured as of half-shell or quarter-shell shape or, depending on the design of the bearing, can generally be contoured in shell shape and can nestle up to the spherical rolling elements, with a corresponding design also being possible with barrel-shaped rolling elements. Said lubricant pocket can, however, generally also be provided with other rolling element shapes, for example cylinder rolls or conical rolls.

In addition to said lubricant pockets 21 and 22 in the raceways 19 and 20 respectively of the example of FIG. 4, the bearing gap 14 can also be filled with the solid lubricant 15 in side sections to the right and to the left of the rolling element row, cf. FIGS. 1 and 2, with said bearing gap 14 advantageously being able to be likewise completely filled there, in particular such that the solid lubricant 15 forms a bridge between the bearing rings 2 and 3 and connects them to one another and/or seals the bearing gap 14 toward the outside.

In this respect, said lateral bearing gap sections laterally next to the rolling elements can substantially be filled with solid lubricant 15 over the total width of the bearing gap 14.

Furthermore, the bearing gap sections between adjacent rolling elements 23 of a rolling element row can also be filled with solid lubricant 15 so that the solid lubricant 15 provided between adjacent rolling elements so-to-say forms spacers between the rolling elements 23 that keep the rolling elements at a spacing from one another.

Said bearing gap sections between the rolling elements 23 of a rolling element row can be connected to the lateral bearing gap sections 14r and 14l shown in FIG. 4 so that the solid lubricant 15 forms a cage of solid lubricant 15 surrounding the rolling elements 23 that rotates together with the rolling elements 23 relative to the two raceways 2 and 3. This cage-like spacer structure of solid lubricant 15 in particular comprises the two rings of solid lubricant to the right and left of the rolling elements 23 extending—viewed in cross-section of a bearing—to the right and to the left of a respective rolling element row, which rings of solid lubricant are connected to one another in the manner of a bridge between the rolling elements, and indeed likewise by solid lubricant that extends in the cavities between adjacent rolling elements 23.

We claim:

1. A large roller bearing comprising:

two concentric races comprising an outer race and an inner race, wherein the inner race comprises a groove opening towards the outer race, wherein the outer race comprises a projection towards the groove; and rollers comprising a first axial bearing row, a second axial bearing row, and a radial bearing row forming an open center large roller bearing, wherein the first axial bearing row and the second axial bearing row are arranged on opposite sides of the projection, wherein the first axial bearing row and the second axial bearing row are in a bearing gap between the two concentric races, wherein the bearing gap is positioned around the projection, wherein the radial bearing row is in the bearing gap between the first axial bearing row and the second axial bearing row to support the projection against the groove, wherein at least one of the first axial bearing row, the second axial bearing row, and the radial bearing row comprises cylindrical rollers, wherein the two concentric races are supportable relative to each other in an axial direction via the first axial bearing row and the second axial bearing row, wherein the two concentric races are supportable relative to each other in a radial direction via the radial bearing row, wherein the first axial bearing row is rollable on first raceways, wherein the second axial bearing row is rollable on second raceways, wherein the radial bearing row is rollable on third raceways, wherein the bearing gap changes direction between the radial bearing row and the first axial bearing row such that the bearing gap has a corner between the radial bearing row and the first axial bearing row, wherein the bearing gap changes direction between the radial bearing row and the second axial bearing row such that the bearing gap has a corner between the radial bearing row and the second axial bearing row, wherein the bearing gap comprises two or more corners comprising the corner between the radial bearing row and the first axial bearing row and the corner between the radial bearing row and the second axial bearing row, wherein the bearing gap is completely filled with a solid lubricant such that bearing gap sections between adjacent rollers of the first axial bearing row are completely filled with the solid lubricant, such that bearing gap sections between adjacent rollers of the second axial bearing row are completely filled with the solid lubricant, such that bearing gap sections between adjacent rollers of the radial bearing row are completely filled with the solid lubricant, such that the bearing gap between the radial bearing row and the first axial bearing row, including the corner between the radial bearing row and the first axial bearing row, is completely filled with the solid lubricant, and such that the bearing gap between the radial bearing row and the second axial bearing row, including the corner between the radial bearing row and the second axial bearing row, is completely filled with the solid lubricant, wherein the bearing gap is formed free of seals other than the solid lubricant, wherein the solid lubricant forms spacers between adjacent rollers of the first axial bearing row, the second axial bearing row, and the radial bearing row to maintain rollers spaced apart from each other, wherein the solid lubricant forms a cage-like spacer structure in the bearing gap that runs around together with the rollers relative to the two concentric races, wherein the cage-like spacer structure comprises connection elements and the spacers, wherein the connection elements are formed by the solid lubricant that connect the spacers to one another, wherein the cage-like spacer structure is exclusively formed by the solid lubricant, wherein the solid lubricant in the bearing gap sections is integrally formed with the solid lubricant that forms the spacers and the connection elements, wherein the bearing gap changes direction between the radial bearing row and the first axial bearing row and changes direction between the radial bearing row and the second axial bearing row such that the bearing gap has a U-shape, wherein the bearing gap between the radial bearing row and the first axial bearing row is completely filled with the solid lubricant such that the radial bearing row is sealed against the first axial bearing row on a first side of the radial bearing row by the solid lubricant, wherein the bearing gap between the radial bearing row and the second axial bearing row is completely filled with the solid lubricant such that the radial bearing row is sealed against the second axial bearing row on a second side of the radial bearing row by the solid lubricant, wherein at least one raceway of the first raceways has an elongate groove-like lubricant pocket in a center section that is completely filled with the solid lubricant and is flanked on both sides by raceway sections that support the first axial bearing row, wherein the solid lubricant is at the right and left towards margins of the at least one raceway of the first raceways, wherein at least one raceway of the second raceways has an elongate groove-like lubricant pocket in a center section that is completely filled with the solid lubricant and is flanked on both sides by raceway sections that support the second axial bearing row, wherein the solid lubricant is at the right and left towards margins of the at least one raceway of the second raceways, wherein at least one raceway of the third raceways has an elongate groove-like lubricant pocket in a center section that is completely filled with the solid lubricant and is flanked on both sides by raceway sections that support the radial bearing row, wherein the solid lubricant is at the right and left towards margins of the at least one raceway of the third raceways, wherein each raceway of the first raceways, the second raceways, and the third raceways comprises the solid lubricant, wherein the large roller bearing is formed free of seals separate from the solid lubricant, and wherein the solid lubricant comprises a polymer matrix and a lubricant embedded therein, wherein the polymer matrix forms a dimensionally stable, deformable, and compressible structure that is self-adapting to deformations of the two concentric races and to forces of the two concentric races relative to each other in response to the deformations.

2. The large roller bearing of claim 1, wherein the elongate groove-like lubricant pocket of the first raceways, viewed in cross-section, forms an approximately crescent-shaped convexity between the raceway sections of the first raceways.

3. The large roller bearing of claim 2, wherein the elongate groove-like lubricant pocket of the second raceways, viewed in cross-section, forms an approximately crescent-shaped convexity between the raceway sections of the second raceways, and wherein the elongate groove-like lubricant pocket of the third raceways, viewed in cross-section, forms an approximately crescent-shaped convexity between the raceway sections of the third raceways.

4. The large roller bearing of claim 1, wherein the solid lubricant lubricates the two concentric races.

5. The large roller bearing of claim 1, wherein the solid lubricant seals the bearing gap toward the rollers toward an outside.

6. The large roller bearing of claim 1, wherein the polymer matrix of the solid lubricant comprises a high molecular or an ultrahigh molecular polyethylene.

7. The large roller bearing of claim 1, wherein the polymer matrix of the solid lubricant forms a porous matrix comprising a plurality of small-volume cutouts.

8. The large roller bearing of claim 1, wherein the lubricant embedded in the polymer matrix is a synthetic oil that has a viscosity in the range of approximately 75-200 mm$^2$/s or a viscosity in the range of 10-25 mm$^2$/s at 100° C.

9. The large roller bearing of claim 1, wherein the lubricant embedded in the polymer matrix has a portion of more than 50 mass % or more than 50 volume percent and/or the polymer matrix has a portion of 20-40 mass % or volume percent with respect to the total mass or to the total volume of the solid lubricant.

10. The large roller bearing of claim 1, wherein a diameter of the large roller bearing defined by an outermost or innermost row of the rollers is more than 750 mm.

11. The large roller bearing of claim 1, wherein the first raceways and the second raceways are marginal layer hardened and have a hardness of more than 52 HRC.

12. The large roller bearing of claim 1, wherein at least one of the two concentric races has a connector for connecting to a connection construction.

13. The large roller bearing of claim 1, wherein one of the two concentric races has or is rotationally fixedly connected to gear teeth.

14. The large roller bearing of claim 1, wherein the first raceways and the second raceways are inductively hardened.

15. A large roller bearing comprising:
two concentric races comprising an outer race and an inner race, wherein the inner race comprises a groove opening towards the outer race, wherein the outer race comprises a projection towards the groove; and
rollers comprising a first axial bearing row, a second axial bearing row, and a radial bearing row forming an open center large roller bearing, wherein the first axial bearing row and the second axial bearing row are arranged on opposite sides of the projection, wherein the first axial bearing row and the second axial bearing row are in a bearing gap between the two concentric races, wherein the bearing gap is positioned around the projection, wherein the radial bearing row is in the bearing gap between the first axial bearing row and the second axial bearing row to support the projection against the groove, wherein at least one of the first axial bearing row, the second axial bearing row, and the radial bearing row comprises cylindrical rollers,
wherein the two concentric races are supportable relative to each other in an axial direction via the first axial bearing row and the second axial bearing row, wherein the two concentric races are supportable relative to each other in a radial direction via the radial bearing row,
wherein the first axial bearing row is rollable on first raceways, wherein the second axial bearing row is rollable on second raceways, wherein the radial bearing row is rollable on third raceways,
wherein the bearing gap comprises two or more corners and is completely filled with a solid lubricant such that bearing gap sections between adjacent rollers of the first axial bearing row are completely filled with the solid lubricant, such that bearing gap sections between adjacent rollers of the second axial bearing row are completely filled with the solid lubricant, such that bearing gap sections between adjacent rollers of the radial bearing row are completely filled with the solid lubricant, and such that a corner of the two or more corners between the first axial bearing row and the radial bearing row is completely filled with the solid lubricant, wherein the bearing gap is formed free of seals other than the solid lubricant,
wherein the two or more corners of the bearing gap are adjacent to both the inner race and the first axial bearing,
wherein the solid lubricant forms spacers between adjacent rollers of the first axial bearing row, the second axial bearing row, and the radial bearing row to maintain rollers spaced apart from each other,
wherein the solid lubricant forms a cage-like spacer structure in the bearing gap that runs around together with the rollers relative to the two concentric races, wherein the cage-like spacer structure comprises connection elements and the spacers, wherein the connection elements are formed by the solid lubricant that connect the spacers to one another, wherein the cage-like spacer structure is exclusively formed by the solid lubricant,
wherein the solid lubricant in the bearing gap sections is integrally connected to the solid lubricant that forms the spacers such that the solid lubricant in the bearing gap sections and the solid lubricant between adjacent rollers comprises a single integral element of solid lubricant,
wherein the bearing gap between the radial bearing row and the first axial bearing row is completely filled with the solid lubricant such that the radial bearing row is sealed against the first axial bearing row on a first side of the radial bearing row by the solid lubricant,
wherein the bearing gap between the radial bearing row and the second axial bearing row is completely filled with the solid lubricant such that the radial bearing row is sealed against the second axial bearing row on a second side of the radial bearing row by the solid lubricant,
wherein at least one raceway of the first raceways has an elongate groove-like lubricant pocket in a center section that is completely filled with the solid lubricant and is flanked on both sides by raceway sections that support the first axial bearing row, wherein at least one raceway of the second raceways has an elongate groove-like lubricant pocket in a center section that is completely filled with the solid lubricant and is flanked on both sides by raceway sections that support the second axial bearing row, wherein at least one raceway of the third raceways has an elongate groove-like lubricant pocket in a center section that is completely filled with the solid lubricant and is flanked on both sides by raceway sections that support the radial bearing row, wherein an opening to the bearing gap or an end of the bearing gap is formed free of a seal separate from the solid lubricant, wherein the solid lubricant comprises a polymer matrix and a lubricant embedded therein, wherein the polymer matrix forms a dimensionally stable, deformable, and compressible structure that is self-adapting to deformations of the two concentric races and to forces of the two concentric races relative to each other in response to the deformations, wherein the lubricant embedded in the polymer matrix is a synthetic oil that has a viscosity in the range of approximately 75-200 mm$^2$/s or a viscosity in the range of 10-25 mm$^2$/s at 100° C., wherein a diameter of the large roller bearing defined by an outermost or innermost row of the rollers is more than 750 mm, wherein the first raceways and the second raceways are marginal layer hardened and have a hardness of more than 52 HRC, wherein the large roller bearing is an open centered large roller bearing, and wherein the first raceways and the second raceways are inductively hardened.

16. A large roller bearing comprising:

two concentric races comprising an outer race and an inner race, wherein the inner race comprises a groove opening towards the outer race, wherein the outer race comprises a projection towards the groove; and rollers comprising a first axial bearing row, a second axial bearing row, and a radial bearing row forming an open center large roller bearing, wherein the first axial bearing row and the second axial bearing row are arranged on opposite sides of the projection, wherein the first axial bearing row and the second axial bearing row are in a bearing gap between the two concentric races, wherein the bearing gap is positioned around the projection, wherein the radial bearing row is in the bearing gap between the first axial bearing row and the second axial bearing row to support the projection against the groove, wherein at least one of the first axial bearing row, the second axial bearing row, and the radial bearing row comprises cylindrical rollers, wherein the two concentric races are supportable relative to each other in an axial direction via the first axial bearing row and the second axial bearing row, wherein the two concentric races are supportable relative to each other in a radial direction via the radial bearing row, wherein the first axial bearing row is rollable on first raceways, wherein the second axial bearing row is rollable on second raceways, wherein the radial bearing row is rollable on third raceways, wherein the bearing gap has a corner between the first axial bearing row and the radial bearing row, wherein the bearing gap comprises two or more corners comprising the corner between the first axial bearing row and the radial bearing row, wherein the bearing gap is completely filled with a solid lubricant such that bearing gap sections between adjacent rollers of the first axial bearing row are completely filled with the solid lubricant, such that bearing gap sections between adjacent rollers of the second axial bearing row are completely filled with the solid lubricant, such that bearing gap sections between adjacent rollers of the radial bearing row are completely filled with the solid lubricant, and such that the corner between the first axial bearing row and the radial bearing row is completely filled with the solid lubricant, wherein the bearing gap is formed free of seals other than the solid lubricant, wherein the solid lubricant forms spacers between adjacent rollers of the first axial bearing row, the second axial bearing row, and the radial bearing row to maintain rollers spaced apart from each other, wherein the solid lubricant forms a cage-like spacer structure in the bearing gap that runs around together with the rollers relative to the two concentric races, wherein the cage-like spacer structure comprises connection elements and the spacers, wherein the connection elements are formed by the solid lubricant that connect the spacers to one another, wherein the cage-like spacer structure is exclusively formed by the solid lubricant, wherein the solid lubricant in the bearing gap sections is integrally formed with the solid lubricant that forms the cage-like spacer structure, wherein the bearing gap between the radial bearing row and the first axial bearing row is completely filled with the solid lubricant such that the radial bearing row is sealed against the first axial bearing row on a first side of the radial bearing row by the solid lubricant, wherein the solid lubricant forms a ring sealing the bearing gap and the rollers arranged within the solid lubricant toward an outside of the bearing, wherein the solid lubricant forms a bridge connecting the inner race and the outer race, wherein the bearing gap between the radial bearing row and the second axial bearing row is completely filled with the solid lubricant such that the radial bearing row is sealed against the second axial bearing row on a second side of the radial bearing row by the solid lubricant, wherein at least one raceway of the first raceways has an elongate groove-like lubricant pocket in a center section that is completely filled with the solid lubricant and is flanked on both sides by raceway sections that support the first axial bearing row, wherein at least one raceway of the second raceways has an elongate groove-like lubricant pocket in a center section that is completely filled with the solid lubricant and is flanked on both sides by raceway sections that support the second axial bearing row, wherein at least one raceway of the third raceways has an elongate groove-like lubricant pocket in a center section that is completely filled with the solid lubricant and is flanked on both sides by raceway sections that support the radial bearing row, wherein two sides of the bearing gap are formed free of a seal separate from the solid lubricant, and wherein the solid lubricant comprises a polymer matrix and a lubricant embedded therein, wherein the polymer matrix forms a dimensionally stable, deformable, and compressible structure that is self-adapting to deformations of the two concentric races and to forces of the two concentric races relative to each other in response to the deformations.

\* \* \* \* \*